United States Patent
Hosseini et al.

(10) Patent No.: US 11,937,291 B2
(45) Date of Patent: Mar. 19, 2024

(54) DYNAMIC MULTIPLEXING AND PRIORITIZATION FOR RESOLVING A COLLISION OF PHYSICAL UPLINK CHANNELS

(71) Applicant: QUALCOMM Incorporated, San Diego, CA (US)

(72) Inventors: Seyedkianoush Hosseini, San Diego, CA (US); Peter Gaal, San Diego, CA (US); Wanshi Chen, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 17/447,257

(22) Filed: Sep. 9, 2021

(65) Prior Publication Data
US 2022/0086862 A1 Mar. 17, 2022

Related U.S. Application Data

(60) Provisional application No. 62/706,822, filed on Sep. 11, 2020.

(51) Int. Cl.
*H04W 72/566* (2023.01)
*H04W 72/1268* (2023.01)
*H04W 72/23* (2023.01)

(52) U.S. Cl.
CPC ..... *H04W 72/569* (2023.01); *H04W 72/1268* (2013.01); *H04W 72/23* (2023.01)

(58) Field of Classification Search
CPC ........... H04W 72/569; H04W 72/1268; H04W 72/23; H04W 72/21
See application file for complete search history.

(56) References Cited

U.S. PATENT DOCUMENTS

| 2019/0036673 A1* | 1/2019 | Chen | H04L 5/0064 |
| 2020/0344032 A1* | 10/2020 | Yang | H04W 4/40 |
| 2021/0050955 A1* | 2/2021 | Park | H04L 1/1614 |

FOREIGN PATENT DOCUMENTS

| CN | 110971339 A | * | 4/2020 | ........... H04B 7/0626 |
| EP | 3681072 A1 | | 7/2020 | |

(Continued)

OTHER PUBLICATIONS

CATT, Intra-UE multiplexing and prioritization, 3GPP TSG RAN WG1 #102-e, e-Meeting, Aug. 17-28, 2020, R1-2005704 (Year: 2020).*

(Continued)

*Primary Examiner* — Shailendra Kumar
(74) *Attorney, Agent, or Firm* — Harrity & Harrity, LLP

(57) ABSTRACT

Various aspects of the present disclosure generally relate to wireless communication. In some aspects, a user equipment (UE) may receive a multiplexing indication indicating that a first high priority channel scheduled in a first set of resources is to be multiplexed with a low priority channel scheduled in a second set of resources. The UE may receive a prioritization indication associated with a second high priority channel scheduled in a third set of resources. The UE may transmit one or more channels, according to a prioritization or a multiplexing, that include the second high priority channel. The prioritization or the multiplexing may be based at least in part on the multiplexing indication or the prioritization indication. Numerous other aspects are provided.

30 Claims, 7 Drawing Sheets

(56) References Cited

FOREIGN PATENT DOCUMENTS

WO    WO-2021147823 A1 *   7/2021
WO    WO-2022031101 A1 *   2/2022

OTHER PUBLICATIONS

Apple, Remaining Issues of Mode 1 Resource Allocation, 3GPP TSG RAN WG1 #101, e-Meeting, May 25-Jun. 5, 2020, R1-2004216 (Year: 2020).*

Apple: "Remaining Issues of Model Resource Allocation", 3GPP Draft, 3GPP TSG RAN WG1 #101, R1-2004216, 3rd Generation Partnership Project (3GPP), Mobile Competence Centre, 650, Route Des Lucioles, F-06921 Sophia-Antipolis Cedex, France, vol. RAN WG1, No. e-Meeting, May 25, 2020-Jun. 5, 2020, May 16, 2020 (May 16, 2020), XP051885974, 7 Pages, Retrieved from the Internet: URL: https://ftp.3gpp.org/tsg_ran/WG1_RL1/TSGR1_101-e/Docs/R1-2004216.zip.R1-2004216 Remaining Issues of Model Resource Allocation.docx [Retrieved on May 16, 2020] section 2.3.2.

CATT: "Intra-UE Multiplexing and Prioritization", 3GPP Draft, 3GPP TSG RAN WG1 #102-e, R1-2005704, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020 (Aug. 8, 2020), XP051917679, 3 Pages, Retrieved from the Internet: URL: https://ftp.3gpp.org/tsg_ran/WG1_RL1/TSGR1_102-e/Docs/R1-2005704.zip.R1-2005704_Intra-UE Multiplexing and Prioritization_final.docx [Retrieved on Aug. 8, 2020] Section 2.1.

International Search Report and Written Opinion—PCT/US2021/071430—ISA/EPO—dated Dec. 22, 2021.

Moderator (OPPO) : "Summary#1 of email Thread [102-e-NR-IIOT_URLLC_enh-04]", 3GPP Draft, 3GPP TSG RAN WG1 #102-e, R1-2007075, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 25, 2020 (Aug. 25, 2020), XP051921420, 14 Pages, Retrieved from the Internet: URL: https://ftp.3gpp.org/tsg_ran/WG1_RL1/TSGR1_102-e/Docs/R1-2007075.zip.R1-2007075URLLC enh-04 Summary#1.doc [Retrieved on Aug. 25, 2020] Section 2.1.

* cited by examiner

US 11,937,291 B2

1

DYNAMIC MULTIPLEXING AND PRIORITIZATION FOR RESOLVING A COLLISION OF PHYSICAL UPLINK CHANNELS

CROSS-REFERENCE TO RELATED APPLICATION

This Patent Application claims priority to Provisional Patent Application No. 62/706,822, filed on Sep. 11, 2020, entitled "DYNAMIC MULTIPLEXING AND PRIORITIZATION FOR RESOLVING A COLLISION OF PHYSICAL UPLINK CHANNELS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for dynamic multiplexing and prioritization for resolving a collision of physical uplink channels.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a multiplexing indication indicating that a first high priority physical uplink channel scheduled in a first set of resources is to be multiplexed with a low priority physical uplink channel scheduled in a second set of resources, the first set of resources at least partially overlapping the second set of resources; receiving a prioritization indication associated with a second high priority physical uplink channel scheduled in a third set of resources, the third set of resources at least partially overlapping the second set of resources; and transmitting one or more physical uplink channels according to a prioritization or a multiplexing, the one or more physical channels including at least the second high priority physical uplink channel, wherein the prioritization or the multiplexing is based at least in part on the multiplexing indication or the prioritization indication.

In some aspects, a UE for wireless communication includes a memory and one or more processors coupled to the memory, the memory and the one or more processors configured to: receive a multiplexing indication indicating that a first high priority physical uplink channel scheduled in a first set of resources is to be multiplexed with a low priority physical uplink channel scheduled in a second set of resources, the first set of resources at least partially overlapping the second set of resources; receive a prioritization indication associated with a second high priority physical uplink channel scheduled in a third set of resources, the third set of resources at least partially overlapping the second set of resources; and transmit one or more physical uplink channels according to a prioritization or a multiplexing, the one or more physical channels including at least the second high priority physical uplink channel, wherein the prioritization or the multiplexing is based at least in part on the multiplexing indication or the prioritization indication.

In some aspects, a non-transitory computer-readable medium storing one or more instructions for wireless communication includes one or more instructions that, when executed by one or more processors of a UE, cause the one or more processors to: receive a multiplexing indication indicating that a first high priority physical uplink channel scheduled in a first set of resources is to be multiplexed with a low priority physical uplink channel scheduled in a second set of resources, the first set of resources at least partially overlapping the second set of resources; receive a prioritization indication associated with a second high priority physical uplink channel scheduled in a third set of resources, the third set of resources at least partially overlapping the second set of resources; and transmit one or more physical uplink channels according to a prioritization or a multiplexing, the one or more physical channels including at least the second high priority physical uplink channel, wherein the prioritization or the multiplexing is based at least in part on the multiplexing indication or the prioritization indication.

In some aspects, an apparatus for wireless communication includes means for receiving a multiplexing indication indicating that a first high priority physical uplink channel scheduled in a first set of resources is to be multiplexed with a low priority physical uplink channel scheduled in a second set of resources, the first set of resources at least partially overlapping the second set of resources; means for receiving a prioritization indication associated with a second high priority physical uplink channel scheduled in a third set of resources, the third set of resources at least partially overlapping the second set of resources; and means for transmitting one or more physical uplink channels according to a prioritization or a multiplexing, the one or more physical channels including at least the second high priority physical uplink channel, wherein the prioritization or the multiplexing is based at least in part on the multiplexing indication or the prioritization indication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
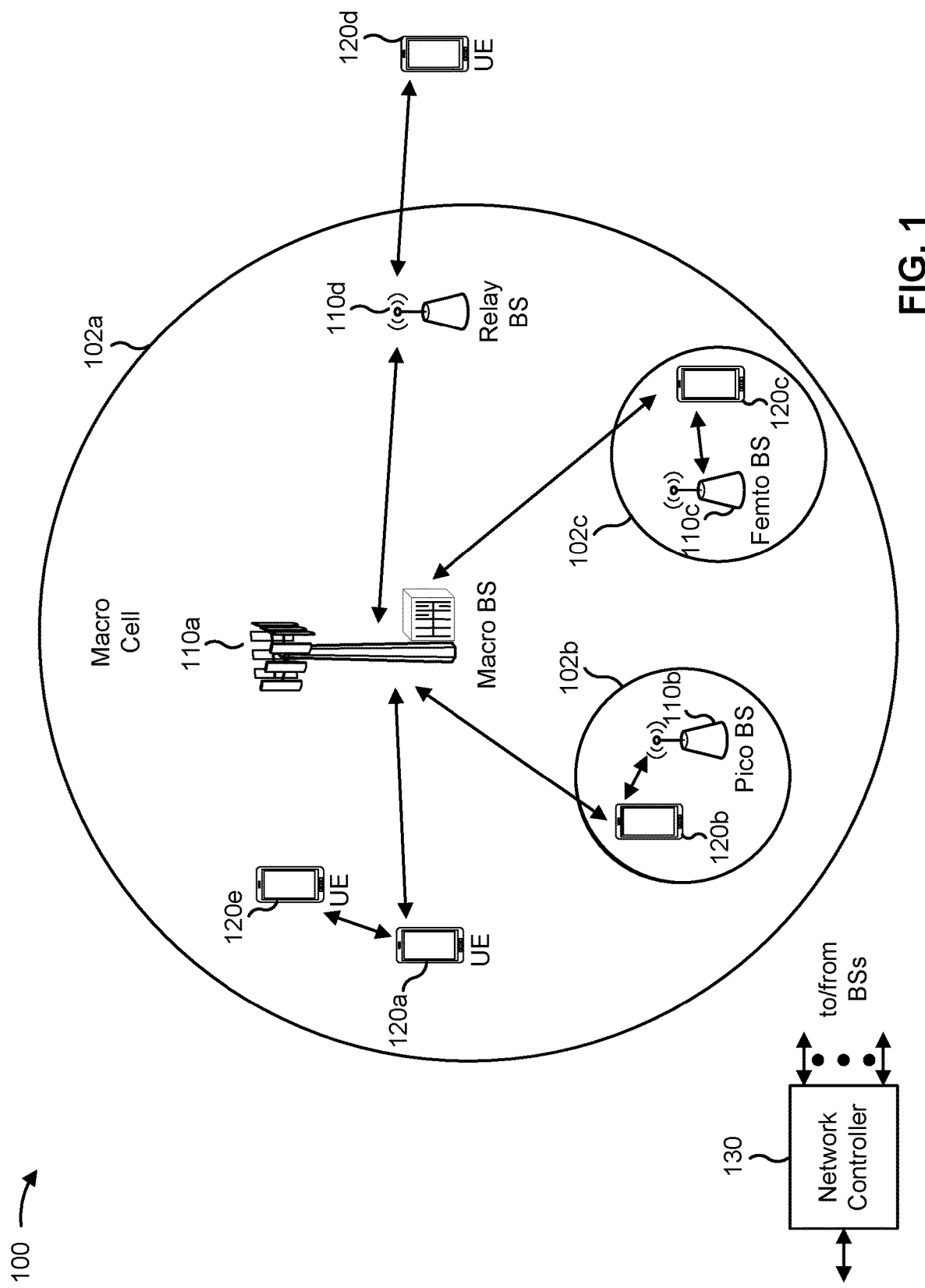
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
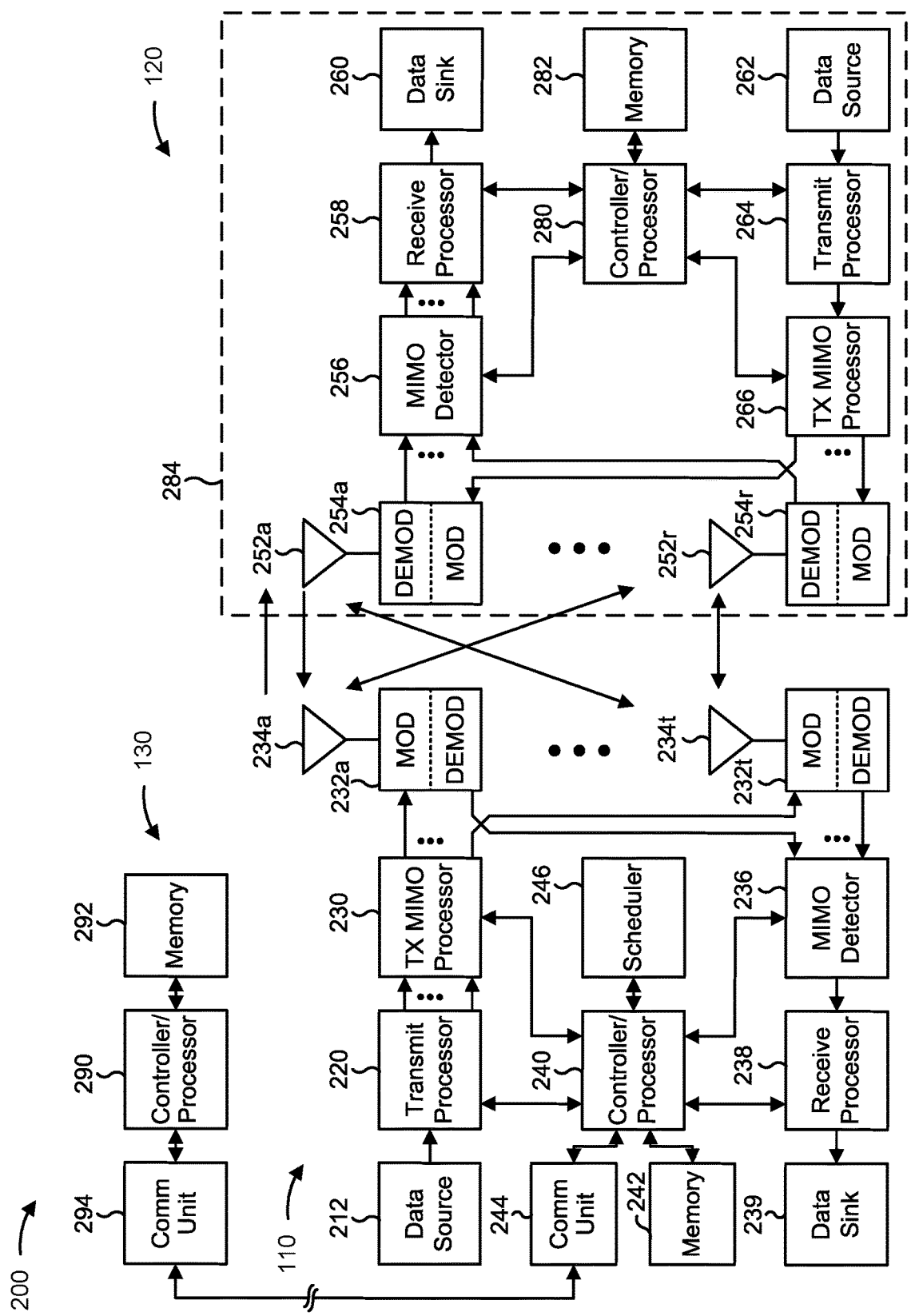
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4A-4C and 5.

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4A-4C and 5.

The controller/processor 240 of the base station 110, the controller/processor 280 of the UE 120, and/or any other component(s) of FIG. 2 may perform one or more techniques associated with dynamic multiplexing and prioritization for resolving a collision of physical uplink channels, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, and/or other processes as described herein, and/or other processes as described herein. In some examples, executing instructions may include running the instructions, converting the instructions, compiling the instructions, and/or interpreting the instructions, among other examples.

In some aspects, a UE (e.g., UE 120) may include means for receiving a multiplexing indication indicating that a first high priority physical uplink channel scheduled in a first set of resources is to be multiplexed with a low priority physical uplink channel scheduled in a second set of resources, the first set of resources at least partially overlapping the second set of resources; means for receiving a prioritization indication associated with a second high priority physical uplink channel scheduled in a third set of resources, the third set of resources at least partially overlapping the second set of resources; and/or means for transmitting one or more physical uplink channels according to a prioritization or a multiplexing, the one or more physical channels including at least the second high priority physical uplink channel, wherein the prioritization or the multiplexing is based at least in part on the multiplexing indication or the prioritization indication. The means for the UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE 120 includes means for dropping the low priority physical uplink channel, and/or means for multiplexing the first high priority physical uplink channel and the second high priority physical uplink channel.

In some aspects, the UE 120 includes means for dropping the low priority physical uplink channel, means for dropping the first high priority physical uplink channel, and/or means for transmitting the second high priority physical uplink channel.

In some aspects, the UE 120 includes means for multiplexing the first high priority physical uplink channel and the second high priority physical uplink channel, and/or means for transmitting the low priority physical uplink channel based at least in part on a determination that a set of resources of a channel resulting from multiplexing the first high priority physical uplink channel and the second high priority physical uplink channel does not overlap the second set of resources.

In some aspects, the UE 120 includes means for transmitting a physical uplink shared channel (PUSCH) on a secondary cell simultaneously with transmitting the one or more physical uplink channels, the one or more physical uplink channels being transmitted on a primary cell.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
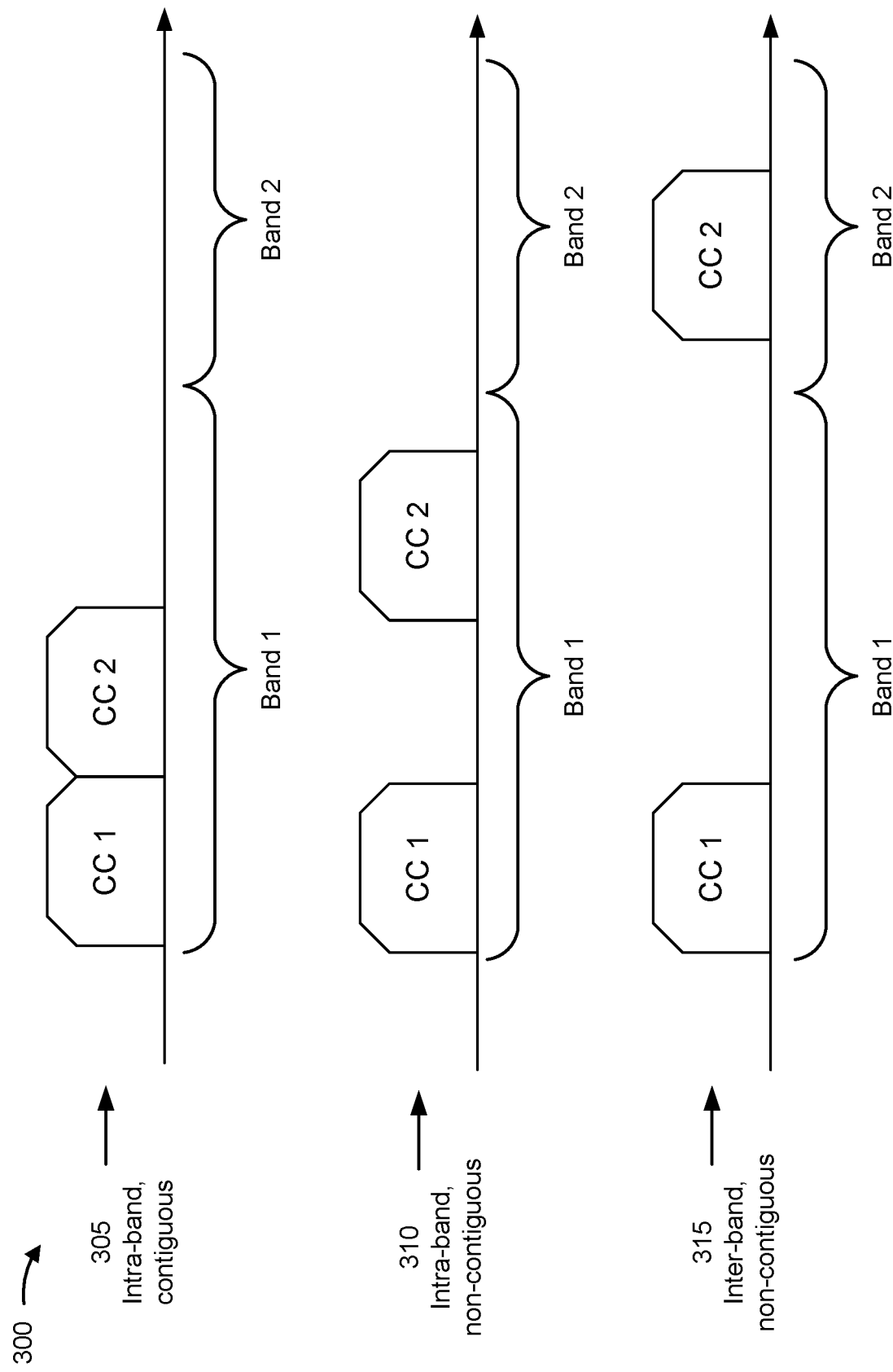
FIG. 3 is a diagram illustrating examples of carrier aggregation, in accordance with the present disclosure.

FIG. 3 is a diagram illustrating examples 300 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A base station 110 may configure carrier aggregation for a UE 120, such as in a radio resource control (RRC) message, and/or downlink control information (DCI).

As shown by reference number 305, in some aspects, carrier aggregation may be configured in an intra-band contiguous mode where the aggregated carriers are contiguous to one another and are in the same band. As shown by reference number 310, in some aspects, carrier aggregation may be configured in an intra-band non-contiguous mode where the aggregated carriers are non-contiguous to one another and are in the same band. As shown by reference number 315, in some aspects, carrier aggregation may be configured in an inter-band non-contiguous mode where the aggregated carriers are non-contiguous to one another and are in different bands.

In carrier aggregation, a UE 120 may be configured with a primary carrier and one or more secondary carriers. In some aspects, the primary carrier may carry control information (e.g., downlink control information, and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

In some cases, a group of carriers may form a physical uplink control channel (PUCCH) group. "PUCCH group" may refer to a group of carriers that includes a primary carrier (e.g., a PCell) and one or more secondary carriers (e.g., SCells). The primary carrier may be used for all PUCCH communications for the PUCCH group.

Similar to carrier aggregation, some wireless communication systems permit dual connectivity of a UE to a network. For example, with dual connectivity, the UE may connect to the network via multiple cells groups, such as a master cell group (MCG), which may include one or more serving cells associated with a master node (MN), and a secondary cell group (SCG), which may include one or more serving cells associated with a secondary node (SN). Each SCG may include a primary secondary cell (PSCell) and one or more secondary cells (SCells). Dual connectivity via the MCG and the SCG (each of which may be controlled by a different base station) may enable improved connectivity, coverage area, and bandwidth for the UE.

As indicated above, FIG. 3 is provided as an example. Other examples may differ from what is described with regard to FIG. 3.

In a communications system, such as 5G or NR, a UE may transmit a communication to a base station on a physical uplink channel (e.g., a PUCCH, a physical uplink shared channel (PUSCH), or the like) in a set of time slots. In some cases, a group of communications may be scheduled (e.g., by the base station, by the UE, or by another entity in the communications system) on physical uplink channels to be transmitted by the UE in sets of time slots that at least partially overlap. For example, a first communication may be scheduled to be transmitted on a first PUCCH in a first set of time slots, and a second communication may be scheduled to be transmitted on a second PUCCH in a second set of time slots that at least partially overlaps the first set of time slots. As another example, a first communication may be scheduled to be transmitted on a PUCCH in a first set of time slots, and a second communication may be scheduled to be transmitted on a PUSCH in a second set of time slots that at least partially overlaps the first set of time slots. A scheduling of a group of physical uplink channels in sets of at least partially overlapping time slots may be referred to as a collision.

In some communication systems, the UE may be permitted to resolve a collision by prioritizing physical uplink channels. For example, the UE may detect a second DCI format scheduling a physical uplink channel with a low priority (e.g., a low priority index). The UE may then detect a first DCI format scheduling a physical uplink channel with a high priority (e.g., a high priority index), where the physical uplink channel with the high priority would at least partially overlap the physical uplink channel with the low priority. In this case, the UE may drop the low priority physical uplink channel and may not expect to transmit physical uplink channels with the low priority due to a later detection of the second DCI format (e.g., a detection of the second DCI format that occurs after the detection of the first DCI format). Thus, the collision is resolved by dropping (i.e., refraining from transmitting) the physical uplink channel with the low priority.

In addition to the above-described prioritization technique, the UE may in some cases be permitted to resolve a collision by multiplexing physical uplink channels with the same priority. For example, the UE may be configured to multiplex a first physical uplink channel with low priority and a second physical uplink channel with the low priority to resolve a collision between the first physical uplink channel with the low priority and a physical uplink channel with a high priority (e.g., when a channel resulting from the multiplexing of the first and second low priority physical uplink channels does not overlap the high priority physical uplink channel). In some cases, timing of uplink grants scheduling the physical uplink channels and/or timing of the physical uplink channels themselves dictate whether a collision is resolved through prioritization or multiplexing physical uplink channels with the same priority.

In some communication systems, the UE may also be permitted to resolve a collision by multiplexing physical uplink channels with different priorities (in addition to being permitted to perform prioritization for physical uplink channels of different priorities and/or perform multiplexing for physical uplink channels with the same priority, as described above). Thus, for a given collision, the UE may need to determine whether to perform a multiplexing of physical uplink channels with different priorities or to perform a prioritization of the physical uplink channels with different priorities.

In some cases, the decision by the UE whether to perform multiplexing or prioritization for physical uplink channels with different priorities may be made dynamically, such as based on signaling (e.g., Layer 1 (L1) signaling) that indicates whether prioritization or multiplexing should be applied to overlapping physical uplink channels. In some cases, the decision by the UE whether to perform multiplexing or prioritization may be configured for some transmissions, such as a scheduling request, a configured PUSCH or PUCCH in response to a semi-persistent scheduling (SPS) physical downlink shared channel (PDSCH), among other examples. However, in some cases, the UE may receive conflicting indications. For example, the UE may receive a first indication indicating that a first high priority physical uplink channel is to be multiplexed with a low priority physical uplink channel, and may then receive a prioritization indication indicating that a second high priority physical uplink channel is to be prioritized over the low priority physical uplink channel. In such a case, the UE needs to determine whether to perform multiplexing and/or prioritization in association with transmitting the first high priority physical uplink channel, the low priority physical uplink channel, and/or the second high priority physical uplink channel.

Furthermore, in some communication systems, the UE may be permitted to transmit a PUCCH and a PUSCH simultaneously on different carriers. In such cases, the decision of whether to perform multiplexing and/or prioritization in association with resolving a collision of physical uplink channels with different priorities may be impacted. That is, whether the UE performs multiplexing and/or prioritization may depend on whether the UE is permitted to simultaneously transmit a PUCCH and a PUSCH, in some cases.

Some aspects described herein provide techniques and apparatuses for dynamic multiplexing and prioritization for resolving a collision of physical uplink channels. In some aspects, a UE may receive a multiplexing indication indicating that a first high priority physical uplink channel scheduled in a first set of resources is to be multiplexed with a low priority physical uplink channel scheduled in a second set of resources, where the first set of resources at least partially overlaps the second set of resources. The UE may also receive a prioritization indication associated with a second high priority physical uplink channel scheduled in a third set of resources, where the third set of resources at least partially overlapping the second set of resources. Here, the UE may transmit one or more physical uplink channels according to a prioritization or a multiplexing, where the one or more physical channels include at least the second high priority physical uplink channel. In some aspects, the prioritization or the multiplexing is based at least in part on the multiplexing indication or the prioritization indication. In this way, the UE is capable of dynamically resolve a collision between different physical uplink channels with conflicting indications, which increases the reliability of the UE, and/or increases the operability of the UE.

Figure 4A:
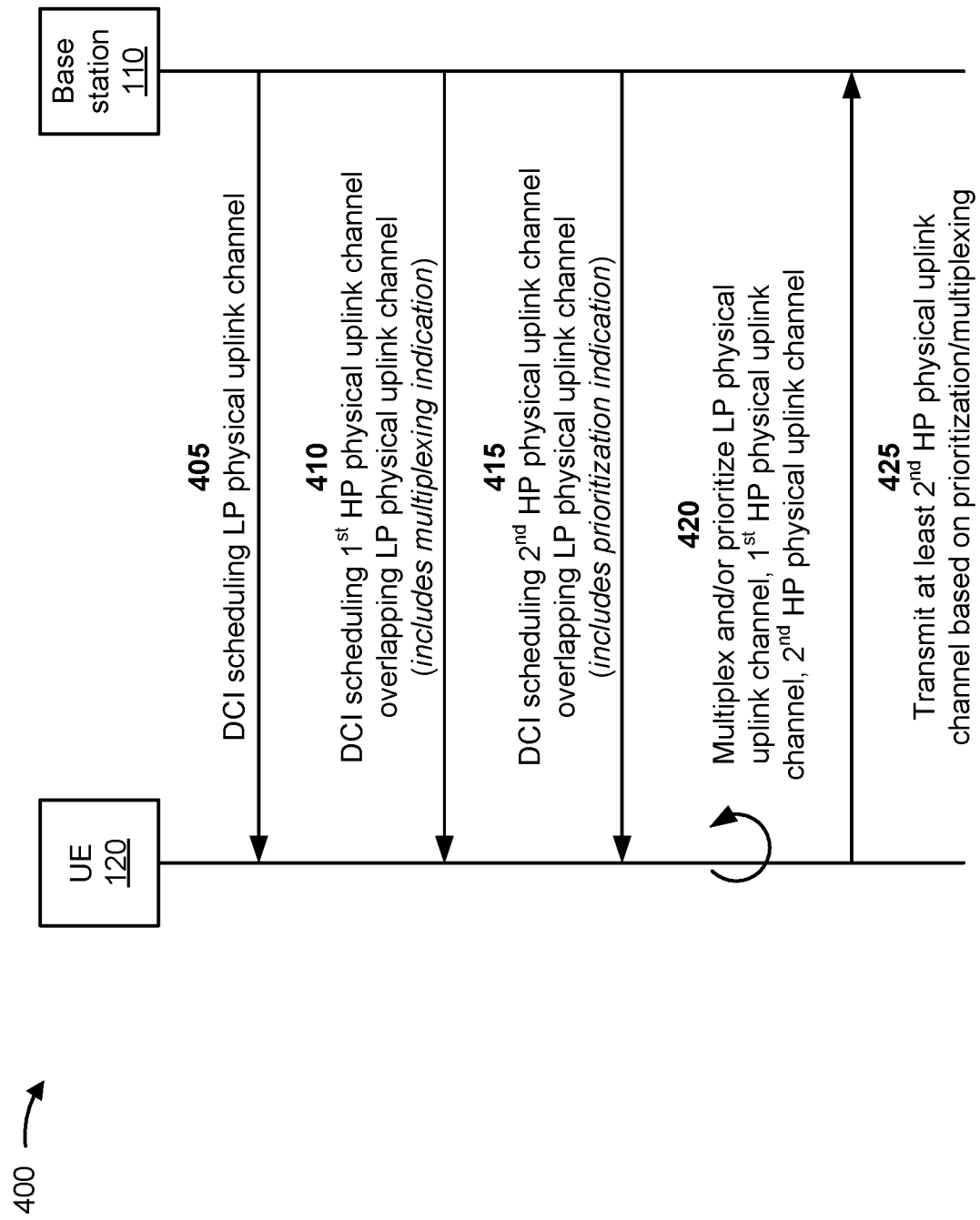
FIGS. 4A-4C are diagrams associated with an example of dynamic multiplexing and prioritization for resolving a collision of physical uplink channels, in accordance with the present disclosure.
Figure 4B:
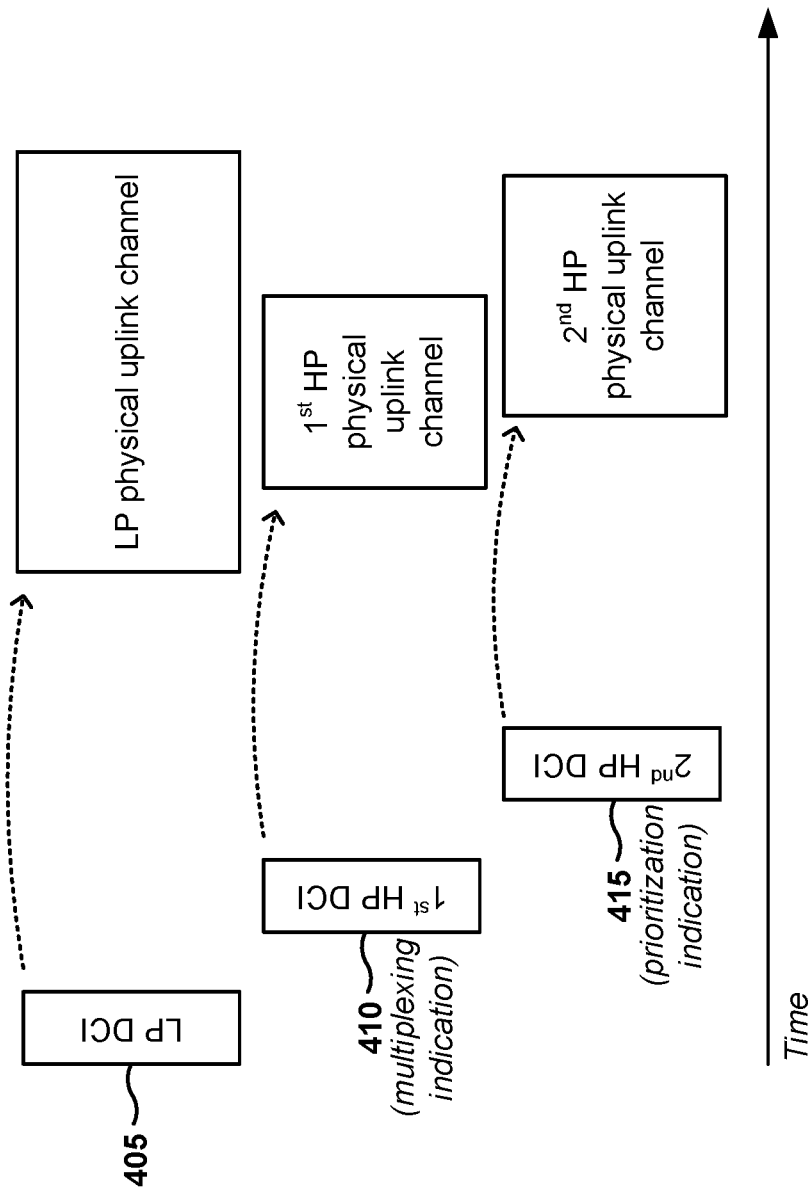
Figure 4C:
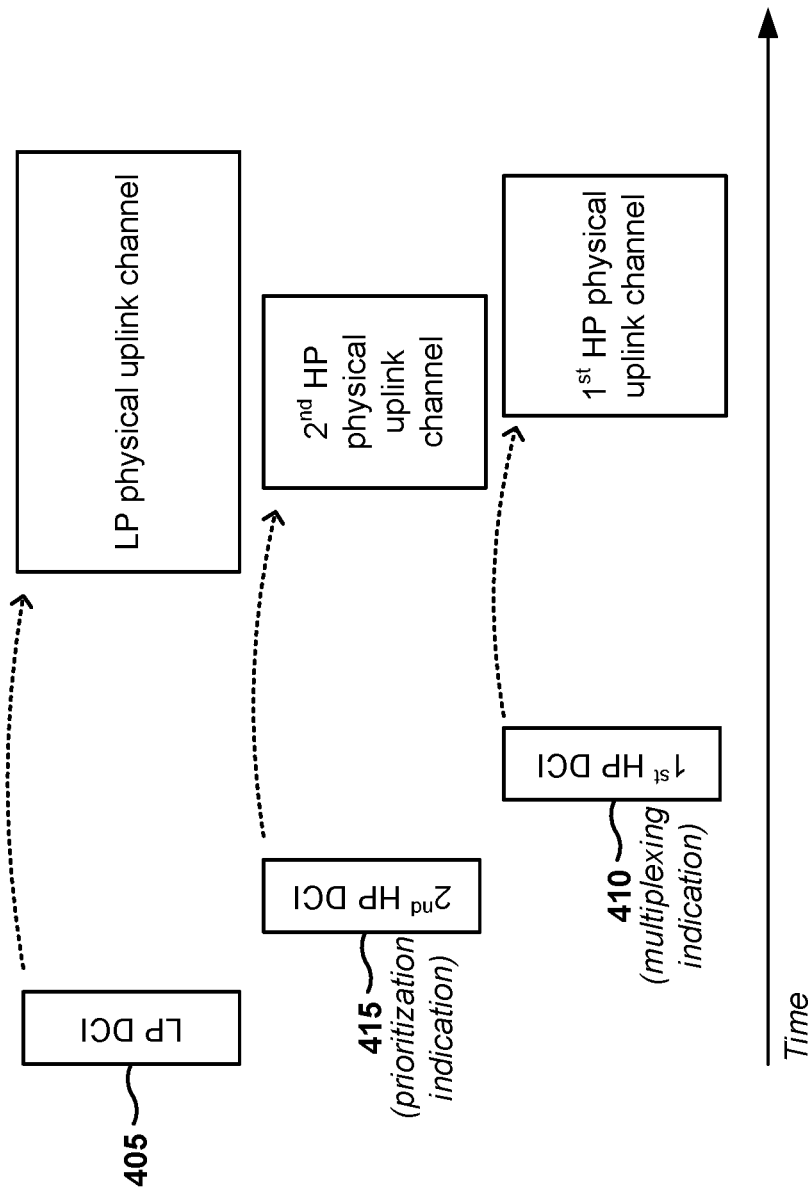

FIGS. 4A-4C are diagrams associated with an example 400 of dynamic multiplexing and prioritization for resolving a collision of physical uplink channels, in accordance with the present disclosure. As shown in FIG. 4A, example 400 includes communication between a UE 120 and a base station. In some aspects, the UE 120 and the base station 110 may be included in a wireless network, such as wireless network 100. The base station 110 and the UE 120 may communicate on a wireless access link, which may include an uplink and a downlink.

As shown in FIG. 4A, and by reference 405, the UE 120 may receive information scheduling a low priority physical uplink channel in a set of resources. For example, the UE 120 may receive DCI scheduling the low priority physical uplink channel in the set of resources. In some aspects, the DCI may indicate that the physical uplink channel is a low priority physical uplink channel. In some aspects, the low priority physical uplink channel may be a PUCCH or may be a PUSCH.

As shown by reference 410, the UE 120 may receive information scheduling a first high priority physical uplink channel in a set of resources, where the set of resources in which the first high priority physical uplink channel is scheduled at least partially overlaps the set of resources in which the low priority physical uplink channel is scheduled (e.g., such that there is a collision between the first high priority physical uplink channel and the low priority physical uplink channel). For example, the UE 120 may receive DCI scheduling the first high priority physical uplink channel in the set of resources. In some aspects, the DCI may indicate that the physical uplink channel is a high priority physical uplink channel. In some aspects, the first high priority physical uplink channel may be a PUCCH or may be a PUSCH.

As further shown by reference 410, the UE 120 receives a multiplexing indication indicating that the first high priority physical uplink channel is to be multiplexed with the low priority physical uplink channel. For example, the DCI scheduling the first high priority physical uplink channel may include the multiplexing indication. In some aspects, the multiplexing indication indicates that the first high priority physical uplink channel is to be multiplexed with overlapping low priority physical uplink channels and/or overlapping high priority physical uplink channels.

As shown by reference 415, the UE 120 may receive information scheduling a second high priority physical uplink channel in a set of resources, where the set of resources in which the second high priority physical uplink channel is scheduled at least partially overlaps the set of resources in which the low priority physical uplink channel is scheduled (e.g., such that there is a collision between the second high priority physical uplink channel and the low priority physical uplink channel). For example, the UE 120 may receive DCI scheduling the second high priority physical uplink channel in the set of resources. In some aspects, the DCI may indicate that the physical uplink channel is a high priority physical uplink channel. In some aspects, the second high priority physical uplink channel may be a PUCCH or may be a PUSCH.

As further shown by reference 415, the UE 120 receives a prioritization indication indicating that the second high priority physical uplink channel is to be prioritized over the low priority physical uplink channel. For example, the DCI scheduling the second high priority physical uplink channel may include the prioritization indication. In some aspects, the prioritization indication indicates that the second high priority physical uplink channel is to be prioritized over overlapping low priority physical uplink channels.

In some aspects, the UE 120 receives the prioritization indication associated with the second high priority physical uplink channel after the UE 120 receives the multiplexing indication associated with the first high priority physical uplink channel. For example, the second high priority physical uplink channel may be scheduled after the first high priority physical uplink channel in the time domain FIG. 4B is a diagram illustrating a case in which the UE 120 receives the prioritization indication associated with the second high priority physical uplink channel after the UE 120 receives the multiplexing indication associated with the first high priority physical uplink channel.

In some aspects, the UE 120 receives the multiplexing indication associated with the first high priority physical uplink channel after the UE 120 receives the prioritization indication associated with the second high priority physical uplink channel. For example, the first high priority physical uplink channel may be scheduled after the second high priority physical uplink channel in the time domain FIG. 4C is a diagram illustrating a case in which the UE 120 receives the multiplexing indication associated with the first high priority physical uplink channel after the UE 120 receives the prioritization indication associated with the second high priority physical uplink channel.

In some aspects, a manner in which the UE 120 performs multiplexing and/or prioritization depends on an order in which the multiplexing indication and the prioritization indication are received, as described below. In some aspects, the reception of the multiplexing indication after the reception of the prioritization indication may be permitted. Alternatively, in some aspects, the reception of the multiplexing indication after the reception of the prioritization indication may not be expected by the UE. That is, in some aspects, the reception of the multiplexing indication after the reception of the prioritization indication may be an error case. In some aspects, the reception of the prioritization indication after the reception of the multiplexing indication may not be expected by the UE. That is, after receiving the multiplexing indication associated with the first high priority physical uplink channel that overlaps the low priority physical uplink channel, the UE may not expect to receive a prioritization indication associated with another channel that overlaps with the low priority and first high priority physical uplink channels.

Returning to FIG. 4A, and as shown by reference 420, the UE 120 may perform a multiplexing and/or a prioritization of the low priority physical uplink channel, the first high priority physical uplink channel, and the second high priority physical uplink channel. Next, as shown by reference 425, the UE 120 transmits one or more physical uplink channels according to the prioritization or the multiplexing performed by the UE 120.

In some aspects, the transmitting of the one or more physical uplink channels according to the prioritization or the multiplexing includes dropping the low priority physical uplink channel, and multiplexing the first high priority physical uplink channel and the second high priority physical uplink channel.

For example, the UE 120 may receive the multiplexing indication associated with the first high priority physical uplink channel before the UE 120 receives the prioritization indication associated with the second high priority physical uplink channel, as described above. In such a case, after the UE 120 receives the prioritization indication associated with the second high priority physical uplink channel, the UE 120 may determine that the low priority physical uplink channel is to be dropped. With respect to the first high priority physical uplink channel, the UE 120 may determine that the first and second high priority physical uplink channels satisfy a multiplexing timeline (e.g., a timing threshold indicating whether the first and second high priority physical uplink channels can be multiplexed). Thus, the UE 120 may multiplex the first and second high priority physical uplink channels and may drop the low priority physical uplink channel.

As another example, the UE 120 may receive the multiplexing indication associated with the first high priority physical uplink channel before the UE 120 receives the prioritization indication associated with the second high priority physical uplink channel, as described above. In such a case, after the UE 120 receives the prioritization indication associated with the second high priority physical uplink channel, the UE 120 may determine that the low priority physical uplink channel is to be dropped and that the first and second high priority physical uplink channels are to be multiplexed. Notably, in this example, the UE 120 does not explicitly determine that the multiplexing timeline is satisfied. Thus, the UE 120 may multiplex the first and second high priority physical uplink channels and may drop the low priority physical uplink channel.

As another example, the UE 120 may receive the multiplexing indication associated with the first high priority physical uplink channel before the UE 120 receives the prioritization indication associated with the second high priority physical uplink channel, as described above. In such a case, after the UE 120 receives the prioritization indication associated with the second high priority physical uplink channel, the UE 120 may multiplex the first and second high priority physical uplink channels, and may determine that a set of resources of a channel resulting from multiplexing the first and second high priority physical uplink channels at least partially overlaps the set of resources in which the low priority physical uplink channel is scheduled. Based at least in part on this determination, the UE 120 may drop the low priority physical uplink channel. Thus, in this example, the UE 120 multiplexes the physical uplink channels of the same priority first, and when the resulting channel overlaps with the low priority physical uplink channel, the UE 120 drops the low priority physical uplink channel.

As another example, the UE 120 may receive the prioritization indication associated with the second high priority physical uplink channel before the UE 120 receives the multiplexing indication associated with the first high priority physical uplink channel, as described above. In such a case, after the UE 120 receives the multiplexing indication associated with the first high priority physical uplink channel, the UE 120 may multiplex only the high priority physical uplink channel for which prioritization was indicated (e.g., the second high priority physical uplink channel) and the current high priority physical uplink channel for which multiplexing is indicated (e.g., first high priority physical uplink channel). Alternatively, the UE 120 may multiplex all high priority physical uplink channels (e.g., the first and second high priority physical uplink channels). In these examples, the UE 120 may be configured to drop the low priority physical uplink channel based at least in part on the prioritization indication. Thus, the UE 120 may multiplex the first and second high priority physical uplink channels and may drop the low priority physical uplink channel.

As another example, the UE 120 may receive the prioritization indication associated with the second high priority physical uplink channel before the UE 120 receives the multiplexing indication associated with the first high priority physical uplink channel, as described above. In such a case, after the UE 120 receives the multiplexing indication associated with the first high priority physical uplink channel, the UE 120 may multiplex the first and second high priority physical uplink channels, and may determine that a set of resources of a channel resulting from multiplexing the first and second high priority physical uplink channels at least partially overlaps the set of resources in which the low priority physical uplink channel is scheduled. Based at least in part on this determination, the UE 120 may drop the low priority physical uplink channel. Thus, in this example, the UE 120 multiplexes the physical uplink channels of the same priority first, and when the resulting channel overlaps with the low priority physical uplink channel, the UE 120 drops the low priority physical uplink channel.

In some aspects, the transmitting of the one or more physical uplink channels according to the prioritization or the multiplexing includes dropping the low priority physical uplink channel, dropping the first high priority physical uplink channel, and transmitting the second high priority physical uplink channel.

As another example, the UE 120 may receive the multiplexing indication associated with the first high priority physical uplink channel before the UE 120 receives the prioritization indication associated with the second high priority physical uplink channel, as described above. In such a case, after the UE 120 receives the prioritization indication associated with the second high priority physical uplink channel, the UE 120 may determine that the low priority physical uplink channel and the high priority physical uplink channel indicated for multiplexing (e.g., the low priority physical uplink channel and the first high priority physical uplink channel) are to be dropped. Here, the rationale is that the first high priority physical uplink channel may be important, but not to the extent that the first high priority physical uplink channel cannot be multiplexed with a low priority physical uplink channel. Therefore, when colliding with a high priority physical uplink channel that requires prioritization (e.g., the second high priority physical uplink channel), the first high priority physical uplink channel can be dropped. Notably, in such a case, if the low priority physical uplink channel is a PUCCH and/or the first high priority physical uplink channel is a PUCCH, then the UE 120 may store the content for piggybacking on another physical uplink channel scheduled after the second high priority channel and indicating multiplexing. Thus, the UE 120 may transmit the second high priority physical uplink channel and may drop the first high priority physical uplink channel and the low priority physical uplink channel.

As another example, the UE 120 may receive the multiplexing indication associated with the first high priority physical uplink channel before the UE 120 receives the prioritization indication associated with the second high priority physical uplink channel, as described above. In such a case, after the UE 120 receives the prioritization indication associated with the second high priority physical uplink channel, the UE 120 may determine that the low priority physical uplink channel is to be dropped. With respect to the first high priority physical uplink channel, the UE 120 may determine that the first and second high priority physical uplink channels do not satisfy a multiplexing timeline (e.g., a timing threshold indicating whether the first and second high priority physical uplink channels can be multiplexed). Thus, the UE 120 may transmit the second high priority physical uplink channel and may drop the first high priority physical uplink channel and the low priority physical uplink channel.

In some aspects, the transmitting of the one or more physical uplink channels according to the prioritization or the multiplexing includes multiplexing the first high priority physical uplink channel and the second high priority physical uplink channel, and transmitting the low priority physical uplink channel based at least in part on a determination that a set of resources of a channel resulting from multiplexing the first high priority physical uplink channel and the second high priority physical uplink channel does not overlap the second set of resources.

For example, the UE 120 may receive the multiplexing indication associated with the first high priority physical uplink channel before the UE 120 receives the prioritization indication associated with the second high priority physical uplink channel, as described above. In such a case, after the UE 120 receives the prioritization indication associated with the second high priority physical uplink channel, the UE 120 may multiplex the first and second high priority physical uplink channels, and may determine that that a set of resources of a channel resulting from multiplexing the first and second high priority physical uplink channels does not at least partially overlap the set of resources in which the low priority physical uplink channel is scheduled. Based at least in part on this determination, the UE 120 may transmit the low priority physical uplink channel. Thus, in this example, the UE 120 multiplexes the physical uplink channels of the same priority first, and transmits the low priority physical uplink channel when the resulting channel does not overlap with the low priority physical uplink channel.

As another example, the UE 120 may receive the prioritization indication associated with the second high priority physical uplink channel before the UE 120 receives the multiplexing indication associated with the first high priority physical uplink channel, as described above. In such a case, after the UE 120 receives the multiplexing indication associated with the first high priority physical uplink channel, the UE 120 may multiplex the first and second high priority physical uplink channels, and may determine that a set of resources of a channel resulting from multiplexing the first and second high priority physical uplink channels does not at least partially overlap the set of resources in which the low priority physical uplink channel is scheduled. Based at least in part on this determination, the UE 120 may transmit the low priority physical uplink channel. Thus, in this example, the UE 120 multiplexes the physical uplink channels of the same priority first, and when the resulting channel does not overlap with the low priority physical uplink channel, the UE 120 transmits the low priority physical uplink channel.

In some aspects, the transmitting of the one or more physical uplink channels according to the prioritization or the multiplexing includes multiplexing the first high priority physical uplink channel, the second high priority physical uplink channel, and the low priority physical uplink channel.

For example, the UE 120 may receive the prioritization indication associated with the second high priority physical uplink channel before the UE 120 receives the multiplexing indication associated with the first high priority physical uplink channel, as described above. In such a case, the UE 120 may be configured to perform multiplexing over all physical uplink channels in a group of overlapping physical uplink channels. Thus, in this example, the UE 120 multiplexes the low priority physical uplink channel, the first high priority physical uplink channel, and the second high priority physical uplink channel.

In some aspects, a single PUCCH group is configured for the UE 120 and simultaneous PUCCH and PUSCH transmission is not permitted. In such cases, the UE 120 may perform any one or more of the techniques for multiplexing and/or prioritization described herein.

In some aspects, a single PUCCH group is configured for the UE 120 and simultaneous PUCCH and PUSCH transmission across multiple carriers is permitted. In some such cases, the multiplexing or the prioritization is performed on a primary cell only. For example, multiplexing across PUCCH and PUSCH as well as PUCCH and PUCCH with different priorities may happen on the primary cell only. Here, because parallel transmission across different carriers is permitted, prioritization is also limited to the primary cell. Hence, handling multiplexing and prioritization both are limited to the primary cell, and can be performed using any one or more of the techniques described herein. In some aspects, because simultaneous PUCCH and PUSCH transmission is permitted, the UE 120 may transmit a PUSCH on a secondary cell simultaneously with transmitting the one or more physical uplink channels on the primary cell according to the multiplexing or the prioritization.

Alternatively, in some cases in which a single PUCCH group is configured for the UE 120 and simultaneous PUCCH and PUSCH transmission across multiple carriers is permitted, the prioritization or the multiplexing is permitted to be performed across the multiple carriers. For example, when a PUCCH is scheduled/configured for transmission on the primary cell and is indicated for multiplexing, the PUCCH can be multiplexed with any overlapping PUSCH on any carrier. Here, as an example, the UE 120 may select the PUSCH with which the PUCCH is to be multiplexed as an overlapping PUSCH on a carrier with an index (e.g., a lowest index). Further, the UE 120 may select the PUSCH with a same priority as the PUCCH (e.g., the UE 120 may select the carrier of the index that has a PUSCH of the same priority scheduled). Here, if there is no overlapping PUSCH of the same priority on any of the multiple carriers, then the UE 120 may multiplex the PUCCH on the PUSCH on the carrier with the index. Notably, in such a case, when a PUCCH or PUSCH is scheduled on the primary cell and is indicated for prioritization, only physical uplink channels on the primary cell are impacted (i.e., cancelled). In some aspects, because simultaneous PUCCH and PUSCH transmission is permitted, the UE 120 may transmit a PUSCH on a secondary cell simultaneously with transmitting the one or more physical uplink channels on the primary cell according to the multiplexing or the prioritization.

In some aspects, two PUCCH groups are configured for the UE 120 and simultaneous PUCCH and PUSCH transmission is permitted across multiple carriers. In such a case, the prioritization or the multiplexing is performed for each PUCCH group (independently). In some aspects, the prioritization or the multiplexing for a given PUCCH group can be performed using any one or more of the techniques described above.

As indicated above, FIGS. 4A-4C are provided as examples. Other examples may differ from what is described with respect to FIGS. 4A-4C.

Figure 5:
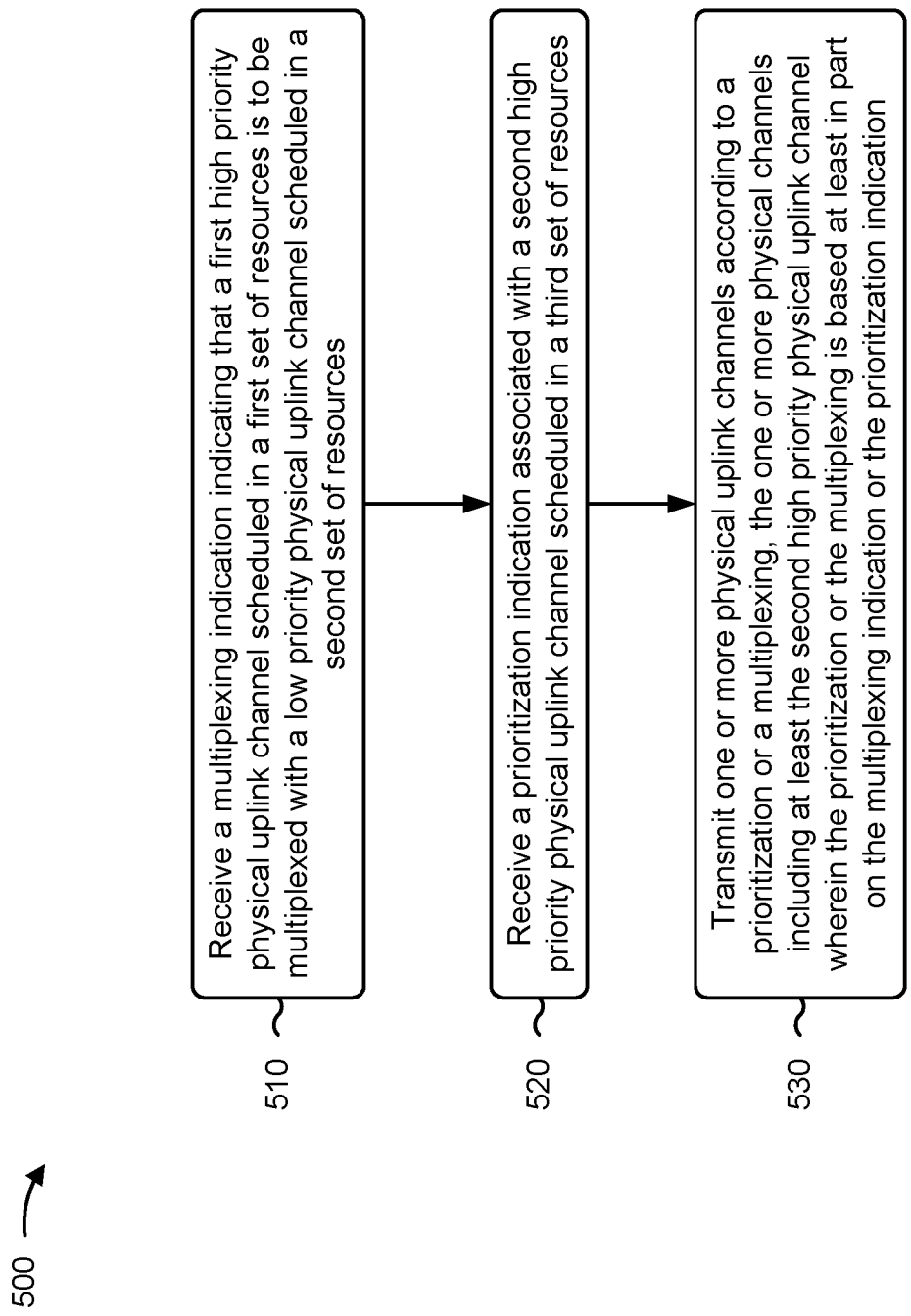
FIG. 5 is a diagram illustrating an example process associated with dynamic multiplexing and prioritization for resolving a collision of physical uplink channels, in accordance with the present disclosure.

FIG. 5 is a diagram illustrating an example process 500 performed, for example, by a UE, in accordance with the present disclosure. Example process 500 is an example where the UE (e.g., UE 120) performs operations associated with dynamic multiplexing and prioritization for resolving a collision of physical uplink channels.

As shown in FIG. 5, in some aspects, process 500 may include receiving a multiplexing indication indicating that a first high priority physical uplink channel scheduled in a first set of resources is to be multiplexed with a low priority physical uplink channel scheduled in a second set of resources, the first set of resources at least partially overlapping the second set of resources (block 510). For example, the UE (e.g., using antenna 252, demodulator 254, MIMO detector 256, receive processor 258, controller/processor 280, and/or memory 282) may receive a multiplexing indication indicating that a first high priority physical uplink channel scheduled in a first set of resources is to be multiplexed with a low priority physical uplink channel scheduled in a second set of resources, the first set of resources at least partially overlapping the second set of resources, as described above.

As further shown in FIG. 5, in some aspects, process 500 may include receiving a prioritization indication associated with a second high priority physical uplink channel scheduled in a third set of resources, the third set of resources at least partially overlapping the second set of resources (block 520). For example, the UE (e.g., using antenna 252, demodulator 254, MIMO detector 256, receive processor 258, controller/processor 280, and/or memory 282) may receive a prioritization indication associated with a second high priority physical uplink channel scheduled in a third set of resources, the third set of resources at least partially overlapping the second set of resources, as described above.

As further shown in FIG. 5, in some aspects, process 500 may include transmitting one or more physical uplink channels according to a prioritization or a multiplexing, the one or more physical channels including at least the second high priority physical uplink channel, wherein the prioritization or the multiplexing is based at least in part on the multiplexing indication or the prioritization indication (block 530). For example, the UE (e.g., using antenna 252, transmit processor 264, TX MIMO processor 266, modulator 254, controller/processor 280, and/or memory 282) may transmit one or more physical uplink channels according to a prioritization or a multiplexing, the one or more physical channels including at least the second high priority physical uplink channel, wherein the prioritization or the multiplexing is based at least in part on the multiplexing indication or the prioritization indication, as described above. In some aspects, the prioritization or the multiplexing is based at least in part on the multiplexing indication or the prioritization indication.

Process 500 may include additional aspects, such as any single aspect or any combination of aspects described below and/or in connection with one or more other processes described elsewhere herein.

In a first aspect, a single PUCCH group is configured for the UE and simultaneous PUCCH and physical uplink shared channel (PUSCH) transmission is not permitted, or simultaneous PUCCH and PUSCH transmission across channels of a same priority or different priorities is permitted, or the PUCCH is multiplexed with the PUSCH of a same priority and multiplexing across the channels of the same priority is performed prior to multiplexing across the channels of different priorities.

In a second aspect, alone or in combination with the first aspect, the prioritization indication is received after the multiplexing indication is received.

In a third aspect, alone or in combination with one or more of the first and second aspects, the multiplexing indication is received after the prioritization indication is received.

In a fourth aspect, alone or in combination with one or more of the first through third aspects, transmitting the one or more physical uplink channels according to the prioritization or the multiplexing comprises dropping the low priority physical uplink channel, and multiplexing the first high priority physical uplink channel and the second high priority physical uplink channel.

In a fifth aspect, alone or in combination with one or more of the first through fourth aspects, the first high priority physical uplink channel and the second high priority physical uplink channel are multiplexed based at least in part on a determination that the first high priority physical uplink channel and the second high priority physical uplink channel satisfy a multiplexing timeline.

In a sixth aspect, alone or in combination with one or more of the first through fifth aspects, the low priority physical uplink channel is dropped based at least in part on a determination that a set of resources of a channel resulting from multiplexing the first high priority physical uplink channel and the second high priority physical uplink channel at least partially overlaps the second set of resources.

In a seventh aspect, alone or in combination with one or more of the first through sixth aspects, transmitting the one or more physical uplink channels according to the prioritization or the multiplexing comprises dropping the low priority physical uplink channel, dropping the first high priority physical uplink channel, and transmitting the second high priority physical uplink channel.

In an eighth aspect, alone or in combination with one or more of the first through seventh aspects, the first high priority physical uplink channel is dropped based at least in part on a determination that the first high priority physical uplink channel and the second high priority physical uplink channel do not satisfy a multiplexing timeline.

In a ninth aspect, alone or in combination with one or more of the first through eighth aspects, transmitting the one or more physical uplink channels according to the prioritization or the multiplexing comprises multiplexing the first high priority physical uplink channel and the second high priority physical uplink channel, and transmitting the low priority physical uplink channel based at least in part on a determination that a set of resources of a channel resulting from multiplexing the first high priority physical uplink channel and the second high priority physical uplink channel does not overlap the second set of resources.

In a tenth aspect, alone or in combination with one or more of the first through ninth aspects, the reception of the multiplexing indication after the reception of the prioritization indication is not expected by the UE.

In an eleventh aspect, alone or in combination with one or more of the first through tenth aspects, transmitting the one or more physical uplink channels according to the prioritization or the multiplexing comprises multiplexing the first high priority physical uplink channel, the second high priority physical uplink channel, and the low priority physical uplink channel.

In a twelfth aspect, alone or in combination with one or more of the first through eleventh aspects, a single PUCCH group is configured for the UE and simultaneous PUCCH and PUSCH transmission across multiple carriers is permitted.

In a thirteenth aspect, alone or in combination with one or more of the first through twelfth aspects, the multiplexing or the prioritization is performed on a primary cell only.

In a fourteenth aspect, alone or in combination with one or more of the first through thirteenth aspects, the prioritization or the multiplexing is permitted to be performed across the multiple carriers.

In a fifteenth aspect, alone or in combination with one or more of the first through fourteenth aspects, process 500 includes transmitting a PUSCH on a secondary cell simultaneously with transmitting the one or more physical uplink channels, the one or more physical uplink channels being transmitted on a primary cell.

In a sixteenth aspect, alone or in combination with one or more of the first through fifteenth aspects, two PUCCH groups are configured for the UE and simultaneous PUCCH and PUSCH transmission is permitted across multiple carriers.

In a seventeenth aspect, alone or in combination with one or more of the first through sixteenth aspects, the prioritization or the multiplexing is performed for each PUCCH group.

In a eighteenth aspect, alone or in combination with one or more of the first through seventeenth aspects, the reception of the prioritization indication after the reception of the multiplexing indication is not expected by the UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A method of wireless communication performed by a user equipment (UE), comprising: receiving a multiplexing indication indicating that a first high priority physical uplink channel scheduled in a first set of resources is to be multiplexed with a low priority physical uplink channel scheduled in a second set of resources; receiving a prioritization indication associated with a second high priority physical uplink channel scheduled in a third set of resources; and transmitting one or more physical uplink channels according to a prioritization or a multiplexing, the one or more physical uplink channels including at least the second high priority physical uplink channel, wherein the prioritization or the multiplexing is based at least in part on the multiplexing indication or the prioritization indication.

Aspect 2: The method of Aspect 1, wherein a single physical uplink control channel (PUCCH) group is configured for the UE and simultaneous PUCCH and physical uplink shared channel (PUSCH) transmission is not permitted, or simultaneous PUCCH and PUSCH transmission across channels of a same priority or channels of different priorities is permitted, or the PUCCH is multiplexed with the PUSCH of a same priority and multiplexing across the channels of the same priority is performed prior to multiplexing across the channels of different priorities.

Aspect 3: The method of any of Aspects 1 through 2, wherein: the prioritization indication is received after the multiplexing indication is received; or the multiplexing indication is received after the prioritization indication is received.

Aspect 4: The method of any of Aspects 1 through 3, wherein transmitting the one or more physical uplink channels according to the prioritization or the multiplexing comprises: dropping the low priority physical uplink channel, and multiplexing the first high priority physical uplink channel and the second high priority physical uplink channel.

Aspect 5: The method of Aspect 4, wherein: the first high priority physical uplink channel and the second high priority physical uplink channel are multiplexed based at least in part on a determination that the first high priority physical uplink channel and the second high priority physical uplink channel satisfy a multiplexing timeline; or the low priority physical uplink channel is dropped based at least in part on a determination that a set of resources of a channel resulting from multiplexing the first high priority physical uplink channel and the second high priority physical uplink channel at least partially overlaps the second set of resources.

Aspect 6: The method of any of Aspects 1 through 5, wherein transmitting the one or more physical uplink channels according to the prioritization or the multiplexing comprises: dropping the low priority physical uplink channel, dropping the first high priority physical uplink channel, and transmitting the second high priority physical uplink channel, wherein the first high priority physical uplink channel is dropped based at least in part on a determination that the first high priority physical uplink channel and the second high priority physical uplink channel do not satisfy a multiplexing timeline.

Aspect 7: The method of any of Aspects 1 through 6, wherein transmitting the one or more physical uplink channels according to the prioritization or the multiplexing comprises: multiplexing the first high priority physical uplink channel and the second high priority physical uplink channel, and transmitting the low priority physical uplink channel based at least in part on a determination that a set of resources of a channel resulting from multiplexing the first high priority physical uplink channel and the second high priority physical uplink channel does not overlap the second set of resources.

Aspect 8: The method of any of Aspects 1 through 7, wherein: the reception of the multiplexing indication after the reception of the prioritization indication is not expected by the UE; or the reception of the prioritization indication after the reception of the multiplexing indication is not expected by the UE.

Aspect 9: The method of any of Aspects 1 through 8, wherein transmitting the one or more physical uplink channels according to the prioritization or the multiplexing comprises multiplexing the first high priority physical uplink channel, the second high priority physical uplink channel, and the low priority physical uplink channel.

Aspect 10: The method of any of Aspects 1 through 9, wherein a single physical uplink control channel (PUCCH) group is configured for the UE and simultaneous PUCCH and physical uplink shared channel (PUSCH) transmission across multiple carriers is permitted, wherein the multiplexing or the prioritization is performed on a primary cell only, or wherein the prioritization or the multiplexing is permitted to be performed across the multiple carriers.

Aspect 11: The method of Aspect 10, further comprising transmitting a PUSCH on a secondary cell simultaneously with transmitting the one or more physical uplink channels, the one or more physical uplink channels being transmitted on a primary cell.

Aspect 12: The method of any of Aspects 1 through 11, wherein two physical uplink control channel (PUCCH) groups are configured for the UE and simultaneous PUCCH and physical uplink shared channel (PUSCH) transmission is permitted across multiple carriers, and wherein the prioritization or the multiplexing is performed for each PUCCH group.

Aspect 13: An apparatus for wireless communication at a device, comprising a processor; memory coupled with the processor; and instructions stored in the memory and executable by the processor to cause the apparatus to perform the method of one or more of Aspects 1-12.

Aspect 14: A device for wireless communication, comprising a memory and one or more processors coupled to the memory, the one or more processors configured to perform the method of one or more of Aspects 1-12.

Aspect 15: An apparatus for wireless communication, comprising at least one means for performing the method of one or more of Aspects 1-12.

Aspect 16: A non-transitory computer-readable medium storing code for wireless communication, the code comprising instructions executable by a processor to perform the method of one or more of Aspects 1-12.

Aspect 17: A non-transitory computer-readable medium storing a set of instructions for wireless communication, the set of instructions comprising one or more instructions that, when executed by one or more processors of a device, cause the device to perform the method of one or more of Aspects 1-12.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories; and
one or more processors, coupled to the one or more memories, individually or collectively, configured to:
receive a multiplexing indication indicating that a first high priority physical uplink channel scheduled in a first set of resources is to be multiplexed with a low priority physical uplink channel scheduled in a second set of resources;
receive a prioritization indication associated with a second high priority physical uplink channel scheduled in a third set of resources, wherein the prioritization indication is received after the multiplexing indication is received, or wherein the multiplexing indication is received after the prioritization indication is received; and
transmit one or more physical uplink channels according to a prioritization or a multiplexing, the one or more physical uplink channels including at least the second high priority physical uplink channel,
wherein the prioritization or the multiplexing is based at least in part on the multiplexing indication or the prioritization indication.

2. The apparatus of claim 1, wherein a single physical uplink control channel (PUCCH) group is configured for the UE and simultaneous PUCCH and physical uplink shared channel (PUSCH) transmission is not permitted, or simultaneous PUCCH and PUSCH transmission across channels of a same priority or different priorities is permitted, or the PUCCH is multiplexed with the PUSCH of a same priority and multiplexing across the channels of the same priority is performed prior to multiplexing across the channels of different priorities.

3. The apparatus of claim 1, wherein the one or more processors, to transmit the one or more physical uplink channels according to the prioritization or the multiplexing, are configured to:
drop the low priority physical uplink channel, and
multiplex the first high priority physical uplink channel and the second high priority physical uplink channel.

4. The apparatus of claim 3, wherein:
the first high priority physical uplink channel and the second high priority physical uplink channel are multiplexed based at least in part on a determination that the first high priority physical uplink channel and the second high priority physical uplink channel satisfy a multiplexing timeline; or
the low priority physical uplink channel is dropped based at least in part on a determination that a set of resources of a channel resulting from multiplexing the first high priority physical uplink channel and the second high priority physical uplink channel at least partially overlaps the second set of resources.

5. The apparatus of claim 1, wherein the one or more processors, to transmit the one or more physical uplink channels according to the prioritization or the multiplexing, are configured to:
drop the low priority physical uplink channel,
drop the first high priority physical uplink channel, and
transmit the second high priority physical uplink channel,
wherein the first high priority physical uplink channel is dropped based at least in part on a determination that the first high priority physical uplink channel and the second high priority physical uplink channel do not satisfy a multiplexing timeline.

6. The apparatus of claim 1, wherein the one or more processors, to transmit the one or more physical uplink channels according to the prioritization or the multiplexing, are configured to:
multiplex the first high priority physical uplink channel and the second high priority physical uplink channel, and
transmit the low priority physical uplink channel based at least in part on a determination that a set of resources of a channel resulting from multiplexing the first high priority physical uplink channel and the second high priority physical uplink channel does not overlap the second set of resources.

7. The apparatus of claim 1, wherein:
the reception of the multiplexing indication after the reception of the prioritization indication is not expected by the UE; or
the reception of the prioritization indication after the reception of the multiplexing indication is not expected by the UE.

8. The apparatus of claim 1, wherein the one or more processors, to transmit the one or more physical uplink channels according to the prioritization or the multiplexing, are configured to multiplex the first high priority physical uplink channel, the second high priority physical uplink channel, and the low priority physical uplink channel.

9. The apparatus of claim 1, wherein a single physical uplink control channel (PUCCH) group is configured for the UE and simultaneous PUCCH and physical uplink shared channel (PUSCH) transmission across multiple carriers is permitted, wherein the multiplexing or the prioritization is performed on a primary cell only, or wherein the prioritization or the multiplexing is permitted to be performed across the multiple carriers.

10. The apparatus of claim 9, wherein the one or more processors are further configured to transmit a PUSCH on a secondary cell simultaneously with transmitting the one or more physical uplink channels, the one or more physical uplink channels being transmitted on a primary cell.

11. The apparatus of claim 1, wherein two physical uplink control channel (PUCCH) groups are configured for the UE and simultaneous PUCCH and physical uplink shared channel (PUSCH) transmission is permitted across multiple carriers, and wherein the prioritization or the multiplexing is performed for each PUCCH group.

12. The apparatus of claim 1, wherein the multiplexing indication corresponds to a first downlink control information message and the prioritization indication comprises a second downlink control information message.

13. A method of wireless communication performed by a user equipment (UE), comprising:
receiving a multiplexing indication indicating that a first high priority physical uplink channel scheduled in a first set of resources is to be multiplexed with a low priority physical uplink channel scheduled in a second set of resources;
receiving a prioritization indication associated with a second high priority physical uplink channel scheduled in a third set of resources, wherein the prioritization indication is received after the multiplexing indication is received, or wherein the multiplexing indication is received after the prioritization indication is received; and
transmitting one or more physical uplink channels according to a prioritization or a multiplexing, the one or more physical uplink channels including at least the second high priority physical uplink channel, wherein the prioritization or the multiplexing is based at least in part on the multiplexing indication or the prioritization indication.

14. The method of claim 13, wherein a single physical uplink control channel (PUCCH) group is configured for the UE and simultaneous PUCCH and physical uplink shared channel (PUSCH) transmission is not permitted.

15. The method of claim 13, wherein transmitting the one or more physical uplink channels according to the prioritization or the multiplexing comprises:
dropping the low priority physical uplink channel, and
multiplexing the first high priority physical uplink channel and the second high priority physical uplink channel.

16. The method of claim 15, wherein:
the first high priority physical uplink channel and the second high priority physical uplink channel are multiplexed based at least in part on a determination that the first high priority physical uplink channel and the second high priority physical uplink channel satisfy a multiplexing timeline; or
the low priority physical uplink channel is dropped based at least in part on a determination that a set of resources of a channel resulting from multiplexing the first high priority physical uplink channel and the second high priority physical uplink channel at least partially overlaps the second set of resources.

17. The method of claim 13, wherein transmitting the one or more physical uplink channels according to the prioritization or the multiplexing comprises:
dropping the low priority physical uplink channel,
dropping the first high priority physical uplink channel, and
transmitting the second high priority physical uplink channel,
wherein the first high priority physical uplink channel is dropped based at least in part on a determination that the first high priority physical uplink channel and the second high priority physical uplink channel do not satisfy a multiplexing timeline.

18. The method of claim 13, wherein transmitting the one or more physical uplink channels according to the prioritization or the multiplexing comprises:
multiplexing the first high priority physical uplink channel and the second high priority physical uplink channel, and
transmitting the low priority physical uplink channel based at least in part on a determination that a set of resources of a channel resulting from multiplexing the first high priority physical uplink channel and the second high priority physical uplink channel does not overlap the second set of resources.

19. The method of claim 13, wherein:
the reception of the multiplexing indication after the reception of the prioritization indication is not expected by the UE; or
the reception of the prioritization indication after the reception of the multiplexing indication is not expected by the UE.

20. The method of claim 13, wherein transmitting the one or more physical uplink channels according to the prioritization or the multiplexing comprises multiplexing the first high priority physical uplink channel, the second high priority physical uplink channel, and the low priority physical uplink channel.

21. The method of claim 13, wherein a single physical uplink control channel (PUCCH) group is configured for the UE and simultaneous PUCCH and physical uplink shared channel (PUSCH) transmission across multiple carriers is permitted, wherein the multiplexing or the prioritization is performed on a primary cell only, or wherein the prioritization or the multiplexing is permitted to be performed across the multiple carriers.

22. The method of claim 21, further comprising transmitting a PUSCH on a secondary cell simultaneously with transmitting the one or more physical uplink channels, the one or more physical uplink channels being transmitted on a primary cell.

23. The method of claim 13, wherein two physical uplink control channel (PUCCH) groups are configured for the UE and simultaneous PUCCH and physical uplink shared channel (PUSCH) transmission is permitted across multiple carriers, and wherein the prioritization or the multiplexing is performed for each PUCCH group.

24. The method of claim 13, wherein the multiplexing indication corresponds to a first downlink control information message and the prioritization indication comprises a second downlink control information message.

25. A non-transitory computer-readable medium storing a set of instructions for wireless communication, the set of instructions comprising:
one or more instructions that, when executed by one or more processors of a user equipment (UE), cause the UE to:
receive a multiplexing indication indicating that a first high priority physical uplink channel scheduled in a first set of resources is to be multiplexed with a low priority physical uplink channel scheduled in a second set of resources;
receive a prioritization indication associated with a second high priority physical uplink channel scheduled in a third set of resources, wherein the prioritization indication is received after the multiplexing indication is received, or wherein the multiplexing indication is received after the prioritization indication is received; and
transmit one or more physical uplink channels according to a prioritization or a multiplexing, the one or more physical uplink channels including at least the second high priority physical uplink channel,
wherein the prioritization or the multiplexing is based at least in part on the multiplexing indication or the prioritization indication.

26. The non-transitory computer-readable medium of claim 25, wherein a single physical uplink control channel (PUCCH) group is configured for the UE and simultaneous PUCCH and physical uplink shared channel (PUSCH) transmission is not permitted.

27. The non-transitory computer-readable medium of claim 25, wherein the multiplexing indication corresponds to a first downlink control information message and the prioritization indication comprises a second downlink control information message.

28. An apparatus for wireless communication, comprising:
means for receiving a multiplexing indication indicating that a first high priority physical uplink channel scheduled in a first set of resources is to be multiplexed with a low priority physical uplink channel scheduled in a second set of resources;
means for receiving a prioritization indication associated with a second high priority physical uplink channel scheduled in a third set of resources, wherein the prioritization indication is received after the multiplexing indication is received, or wherein the multiplexing indication is received after the prioritization indication is received; and means for transmitting one or more physical uplink channels according to a prioritization or a multiplexing, the one or more physical uplink channels including at least the second high priority physical uplink channel, wherein the prioritization or the multiplexing is based at least in part on the multiplexing indication or the prioritization indication.

29. The apparatus of claim 28, wherein a single physical uplink control channel (PUCCH) group is configured for the apparatus and simultaneous PUCCH and physical uplink shared channel (PUSCH) transmission is not permitted.

30. The apparatus of claim 28, wherein the multiplexing indication corresponds to a first downlink control information message and the prioritization indication comprises a second downlink control information message.

* * * * *